United States Patent
Colosimo et al.

(10) Patent No.: US 12,113,280 B2
(45) Date of Patent: Oct. 8, 2024

(54) AIRBORNE REDIRECTION UNIT FOR DEFLECTING A RADIO FREQUENCY ENERGY BEAM

(71) Applicant: BAE Systems plc, London (GB)

(72) Inventors: Nicholas Giacomo Robert Colosimo, Preston (GB); Keith Antony Rigby, Preston (GB); Christopher Charles Rawlinson Jones, Preston (GB)

(73) Assignee: BAE Systems plc, London (GB)

( * ) Notice: Subject to any disclaimer, the term of this patent is extended or adjusted under 35 U.S.C. 154(b) by 373 days.

(21) Appl. No.: 17/613,182

(22) PCT Filed: May 7, 2020

(86) PCT No.: PCT/GB2020/051118
§ 371 (c)(1),
(2) Date: Nov. 22, 2021

(87) PCT Pub. No.: WO2020/234564
PCT Pub. Date: Nov. 26, 2020

(65) Prior Publication Data
US 2022/0311146 A1    Sep. 29, 2022

(30) Foreign Application Priority Data

May 23, 2019   (EP) ..................................... 19275068
May 23, 2019   (GB) ..................................... 1907285

(51) Int. Cl.
*H01Q 19/06*   (2006.01)
*H01Q 19/10*   (2006.01)
(Continued)

(52) U.S. Cl.
CPC ............ *H01Q 19/062* (2013.01); *H01Q 19/10* (2013.01); *F41H 13/0075* (2013.01); *G01S 13/75* (2013.01)

(58) Field of Classification Search
CPC .. H01Q 19/062; H01Q 19/10; F41H 13/0075; G01S 13/75
See application file for complete search history.

(56) References Cited

U.S. PATENT DOCUMENTS 5,940,023 A  *  8/1999  Hintzke ............... H01Q 15/147
                                                               342/10
10,419,948 B1 *  9/2019  Labadie ................. H01Q 3/005
(Continued)

FOREIGN PATENT DOCUMENTS

DE   102005049539 A1   4/2007
EP        2106525 B1   8/2012
(Continued)

OTHER PUBLICATIONS

Partial European Search Report for EP Appl. No. 19275068.5-1011 dated Jan. 29, 2020, 18 Pages.
(Continued)

*Primary Examiner* — Peter M Bythrow
*Assistant Examiner* — Nazra Nur Waheed
(74) *Attorney, Agent, or Firm* — Maine Cernota & Curran

(57) ABSTRACT

An airborne redirection unit (ARU), for deflecting an RF energy beam, the ARU comprising: A canopy comprising a surface for slowing the rate of descent, A beam director supported at the canopy, the ARU being configured to focus the RF energy beam.

7 Claims, 4 Drawing Sheets

(51) Int. Cl.
 *F41H 13/00* (2006.01)
 *G01S 13/75* (2006.01)

(56) References Cited

U.S. PATENT DOCUMENTS

| | | |
|---|---|---|
| 2004/0075884 A1 | 4/2004 | Byren |
| 2012/0050714 A1 | 3/2012 | McConville et al. |
| 2016/0161221 A1 | 6/2016 | Desmond |
| 2016/0184924 A1 | 6/2016 | Kalender et al. |

FOREIGN PATENT DOCUMENTS

| | | |
|---|---|---|
| EP | 2730882 A1 | 5/2014 |
| EP | 2790882 A1 | 5/2014 |
| EP | 2272053 B1 | 4/2015 |

OTHER PUBLICATIONS

K Takehisa, "Considerations of a ship defense with a pulsed COIL", Oct. 27, 2015, Retrieved from the Internet, https://www.spiedigitallibrary.org/conference-proceedings-of-spie/9650/965003/Considerations-of-a-ship-defense-with-a-pulsed-COIL/10.1117/12.2197523.full, retrieved on Jan. 22, 2020.
Extended European Search Report for EP Appl. No. 19275068.5-1011 dated Apr. 22, 2020, 31 Pages.
GB Search Report for GB Appl. No. 1907285.9 dated Nov. 20, 2019, 3 Pages.
International Search Report and Written Opinion for PCT/GB2020/051118 dated Aug. 5, 2020, 12 Pages.
International Preliminary Report on Patentablity for PCT/GB2020/051118 dated Dec. 2, 2021, 8 Pages.

\* cited by examiner

AIRBORNE REDIRECTION UNIT FOR DEFLECTING A RADIO FREQUENCY ENERGY BEAM

RELATED APPLICATIONS

This application is a national phase application filed under 35 USC § 371 of PCT Application No. PCT/GB2020/051118 with an International filing date of May 7, 2020, which claims priority of GB Patent Application 1907285.9 filed May 23, 2019 and EP application 19275068.5 filed May 23, 2019. All of these applications are incorporated herein by reference in their entirety for all purposes.

FIELD OF THE INVENTION

According to the invention there is provided an airborne redirection unit for deflecting an RF energy beam.

BACKGROUND OF THE INVENTION

Often it is desirable to illuminate a target with RF radiation, for example it may be desirable to transmit a radar signal into a given volume of airspace to detect objects in that volume. Further, it may be desirable to illuminate a target with a focussed high power beam.

Typically the source of RF radiation will position itself with an unobstructed and direct line of transmission between itself and the target or volume, and then illuminate the target or volume for a certain duration of time.

The applicant has observed that in certain circumstances, it is not possible or is otherwise disadvantageous to manoeuvre the source of radiation to a direct line of transmission with a designated target or volume.

SUMMARY OF THE INVENTION

According to a first aspect of the invention there is provided an airborne redirection unit (ARU), for deflecting radio frequency (RF) energy beam, the ARU comprising: a canopy comprising a surface for slowing the rate of descent, a beam director supported at the canopy, the ARU being configured to focus the RF energy beam.

The canopy may be configured to, upon illumination with the RF energy beam in a predetermined way, focus the RF energy beam onto the beam director.

The ARU can be configured as a parachute. This tends to provide an easily-deployable, low-cost and light weight ARU.

This tends to provide a larger target for the RF source to illuminate at the ARU and as such can be more tolerant of inexact aim in transmitting the RF energy from the source to the ARU.

The beam director may be for reflecting the RF energy beam and/or may be for focussing the RF energy beam.

By focussing the energy, a more intense illumination can be provided.

The beam director may comprise a steerable element.

As such a greater set of combinations of ARU, target and RF source relative positions can be offered from which the illumination can be performed.

The steerable element may be mounted on a stabilisation rig.

Such a provision can help to maintain a constant illumination of the target.

The ARU may further comprise a sensor for determining the position of the target.

The ARU may further comprise a sensor for determining the characteristics of an incoming RF energy beam or a sensor for determining the position of the source of an incoming RF energy beam, and further comprising an ARU reception-adjustment module for reconfiguring the ARU in response to the determined characteristics of the RF energy beam or the determined position of the source of the RF energy beam.

The beam director may be supported at the canopy by interconnecting lines or struts.

The canopy may comprise an array of beam shaping elements for focusing the RF energy beam.

According to a second aspect of the invention there is provided a method for illuminating a target with radio frequency (RF) energy comprising: providing a steerable source of RF energy, for generating a platform RF energy beam, deploying an airborne redirection unit (ARU) according to the first aspect for redirecting the platform RF energy beam, transmitting the platform RF energy beam towards the ARU, thereby illuminating the ARU, receiving at the ARU the platform energy beam, deflecting at the ARU the platform RF energy beam so as to provide a redirected RF energy beam for transmission towards and illumination of a target.

Such a provision allows for indirect illumination of targets. This can enable the illumination of otherwise inaccessible targets, effectively providing a capability for illuminating around corners once the ARU is deployed The method may further comprise determining the position of the ARU relative to the source of the RF energy, generating, based on the position of the ARU relative to the source of RF energy, a source-aim signal for the RF energy source, the source-aim signal being configured to establish or adjust the RF energy source such that the platform energy beam is directed towards the ARU or remains directed towards the ARU as the position of the ARU or the position of the mobile platform changes.

Further still the method may comprise acquiring information defining the limitations of the steerable source, comparing the limitations of the steerable source to the generated source-aim signal, thereby determining whether the source-aim signal can be fulfilled given the limitations and the instantaneous position of the ARU relative to the source of RF energy, and if the source-aim signal cannot be fulfilled, determining an acceptable position of the ARU relative to the source of RF energy from which the source-aim signal can be fulfilled, moving the ARU or source of RF energy to establish the acceptable position.

By automatically suggesting a position for an improved RF transmission, not only can an illumination be successfully initiated, but by continually looping this process, a continued illumination can be performed.

The method may further comprise determining the position of the target relative to the ARU, generating, based on: the position of the target relative to the ARU, and the position of the ARU relative to the source of the RF energy, a redirect signal for providing a configuration of the ARU such that the ARU may illuminate the target or maintain illumination of the target as the position of the source of RF energy, the ARU or the position of the target changes.

Still further the method may comprise acquiring information defining the limitations for configuring the ARU, comparing the limitations for configuring the ARU, to the redirect signal, thereby determining whether the redirect signal can be fulfilled given the limitations, the instantaneous position of the ARU relative to the source of RF radiation, and the instantaneous position of the ARU relative to the target, and if the redirect signal cannot be fulfilled, determining an acceptable combination of: the position of the ARU relative to the source of RF energy, the position of the ARU relative to the target, the configuration of the ARU, and then implementing the acceptable combination.

By automatically suggesting a position for an improved RF transmission, not only can an illumination be successfully initiated, but by continually looping this process, a continued illumination can be performed.

Yet further the method may comprise providing at the ARU a steerable director for determining the direction of the redirected RF energy beam wherein the redirect signal is configured to adjust the steerable director to maintain illumination of the target as the position of the ARU or the position of the target changes.

As such a greater set of combinations of ARU, target and RF source relative positions can be offered from which the illumination can be performed.

BRIEF DESCRIPTION OF THE DRAWINGS

So that the invention may be well understood, embodiments of it will now be presented with reference to the following figures, of which.

DETAILED DESCRIPTION

Figure 1:
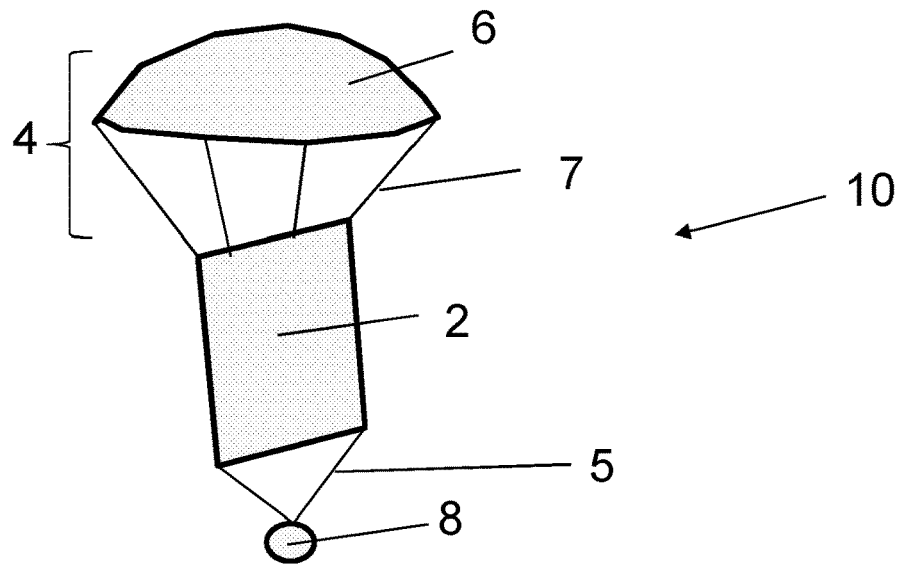
FIG. 1 shows a first embodiment of an airborne redirection unit (ARU) for facilitating the illumination of a target.

Referring to FIG. 1 there is shown an ARU 10 comprising a parachute canopy 6, under which is suspended by lines 7 a director 2. A mass 8 is further suspended from the director 2 by lines 5.

The canopy 6 is substantially dome shaped and is configured to present a surface with a high level of drag, when the ARU 10 is airborne, to decrease the rate of descent. As such the ARU operates as a parachute, slowing the rate of descent of the director 2. The canopy 6 is fabricated from standard parachute materials such as rip-stop nylon.

The director 2 is substantially planar and can be provided for reflecting the RF radiation (e.g. by specular reflection or diffraction). Alternatively, the director 2 can be provided for deflecting the RF radiation as it is transmitted through (e.g. by refraction or diffraction). Either director 2 arrangement can be configured to focus the RF radiation as it is transmitted onwards.

The director 2 is sufficiently rigid to be able to hold its shape whilst airborne and thereby reliably maintain its RF directing characteristics. For example the director 2 may be formed from a layer or layers of sheet material held taut by a frame, or may be formed from an inflatable structure. Alternatively the director 2 may be formed from a dielectric material throughout which a conductive additive has been distributed so as to confer the relevant RF properties.

The characteristics of the mass 8 are determined with regard to the director 2 to provide a suitable weight to hold the director 2 taut and to orient the director 2 in a generally vertical condition.

Figure 2A:
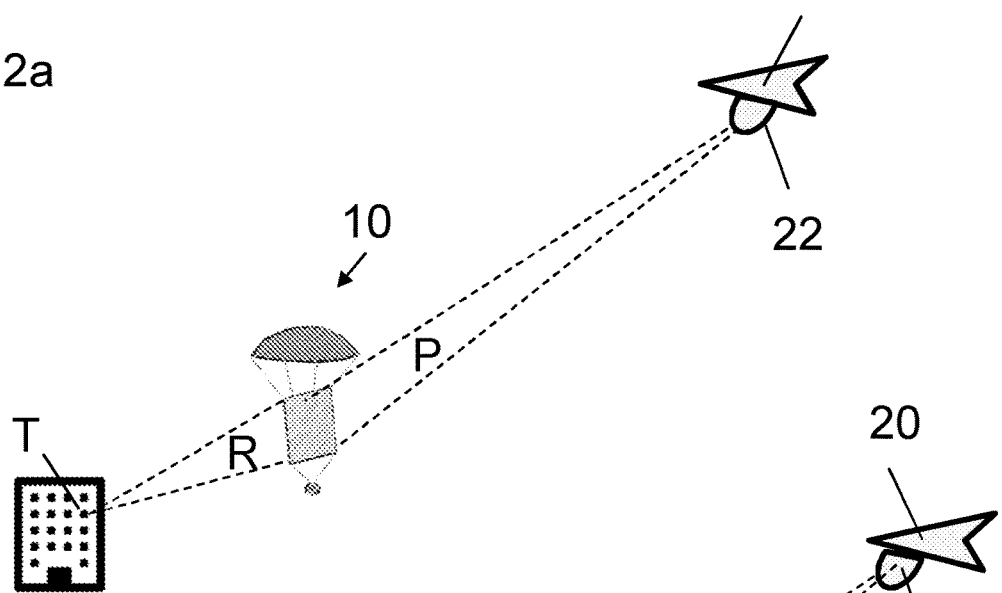
FIG. 2a shows the ARU of FIG. 1 used in illuminating a target.

Referring to FIG. 2a, there is shown an airborne ARU 10 facilitating the illumination of a target T which, as exemplified here, is a particular window of a building. The ARU 10 is operating in combination with a mobile platform 20 on which is mounted a steerable source of RF energy 22.

The ARU 10 is provided with the director 2 configured as a transmissive lens, receiving a divergent beam of RF energy P from the platform 20 (specifically from the steerable source of RF energy 22), and outputting a convergent beam R which is focussed on the target T.

Figure 2B:
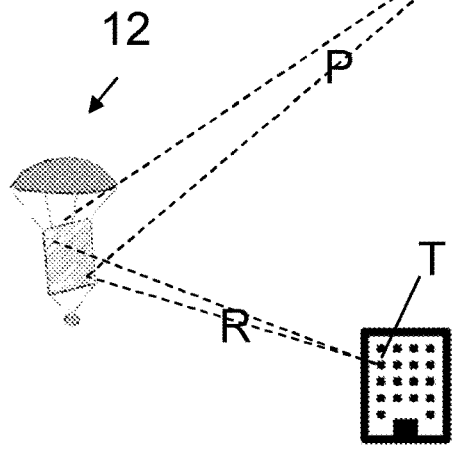
FIG. 2b shows a further ARU used in illuminating a target.

Referring to FIG. 2b, there is shown a second airborne ARU 12 facilitating the illumination of a target T. The ARU 12 is operating in conjunction with a mobile platform 20 outputting a beam R from the steerable source of RF energy 22 which is focussed on the target T.

The ARU 12 is provided with a director configured as a reflective lens, receiving a divergent beam of RF energy P from the platform 20 and subsequently reflecting and focussing the outputted beam R onto the target.

In each of the embodiments shown in FIGS. 2a and 2b, the director 2 is a passive device and as such the platform 20 should manoeuvre to a particular region of airspace, defined by the relative positions of the target and the ARU, to effect a desired redirection of the RF radiation.

For example with the FIG. 2a embodiment, the distance and angle (elevation and azimuth) between the target and ARU 10 director will tend to define a position in the airspace from which an RF transmission having a certain divergence (i.e. as from the source 22) will illuminate the director and thereupon be focussed and directed onto the target.

For example, with the FIG. 2b embodiment, the distance and angle (elevation and azimuth) between the target and ARU 12 director will tend to define a position in the airspace from which an RF transmission having a certain divergence (i.e. as from the source 22) will illuminate the director and thereupon be reflected onto the target. If the divergence is minimal, for example if the RF transmission is a collimated beam, a planar specular reflector may be suitable for use as the director. Where the divergence of the RF transmission from the source 22 is non-negligible, a specular reflector with a certain curvature may be provided. Where the RF energy P is required to travel distances in the order of hundreds of metres, there will tend to be appreciable divergence even with a collimated beam, due to diffraction effects.

Once in that region of airspace, the platform 20 may remain there (e.g. by hovering or circling) to maintain the desired focal characteristic.

In alternative embodiments, the director 2 may be active and thus able to change its shape, orientation or reflective, refractive or diffractive properties to accommodate a wider range of platform positions, and thereby enlarge the region of airspace the platform should remain in whilst effecting the illumination. To accommodate varying platform positions, the ARU would need to be intermittently or continuously informed of the positions of the platform, ARU and target relative to one another, with characteristics adapted accordingly.

In alternative embodiments, the energy source 22 may be able to select a particular divergence for the beam P dependent on the distance between the source 22 and the director 2. Other characteristics of the beam P may be selected, dependent on the angle between the source 22 and the director 2. Accordingly there may be provided a larger airspace envelope in which the transmission can be effected.

As an alternative to the dome canopy, other surfaces for slowing the rate of descent may be provided. For example other air brakes may be provided. The alternative canopies and surfaces may even constitute aerofoils capable of generating lift (e.g. a glider or a rotorcraft).

Figure 3:
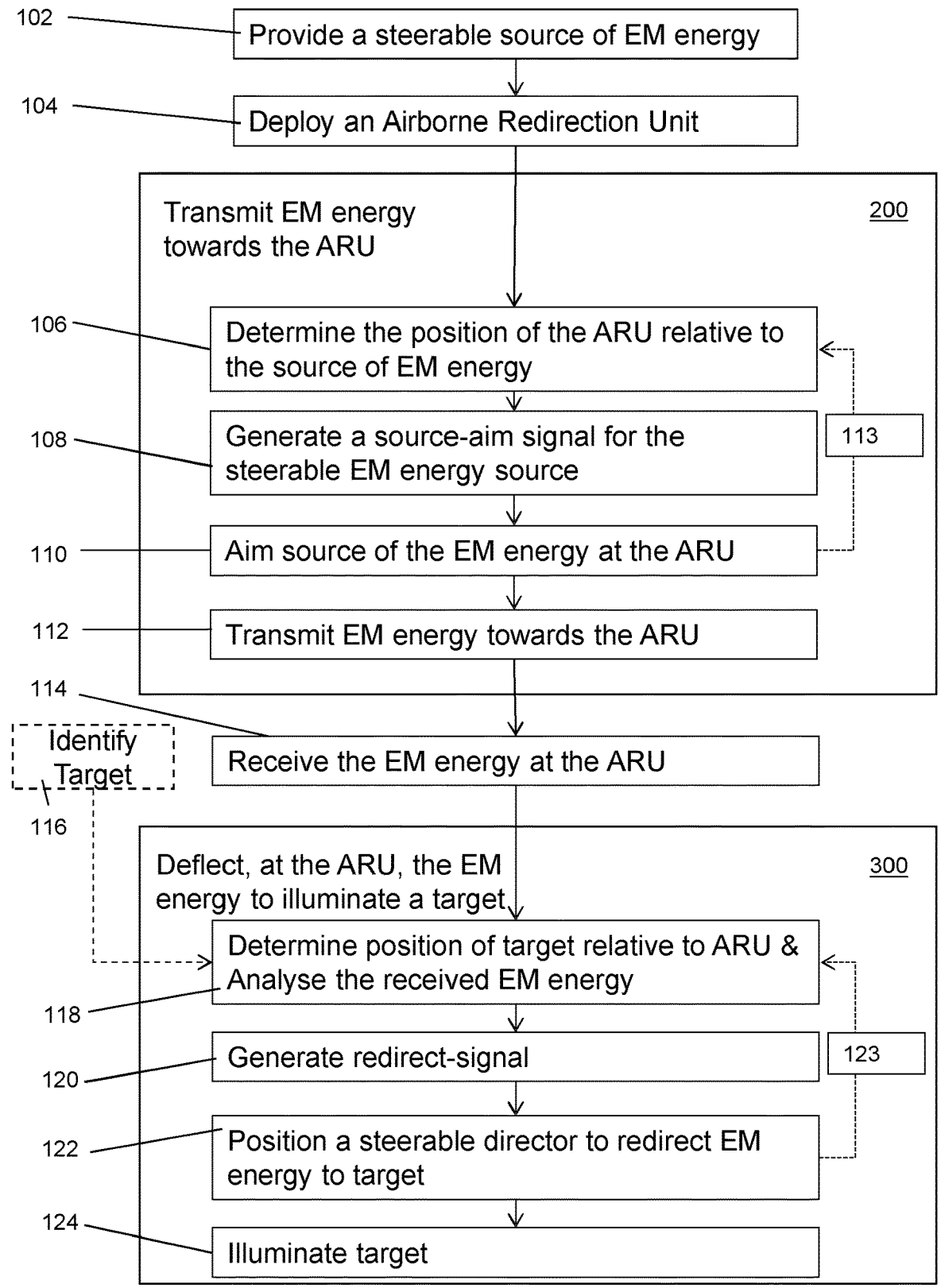
FIG. 3 shows a flow diagram illustrating how an ARU can be used in illuminating a target.

In operation, as can be appreciated with reference to FIG. 3, there is firstly at step 102 provided a steerable source of RF energy 22. In particular, the steerable source of RF energy may be provided at or by the mobile platform 20.

Then, at step 104 an airborne redirection unit (10 or 12) is deployed. This may be deployed from the mobile platform 20 itself, or could be deployed by a separate platform or entity.

Next, at general step 200 the source of RF energy 22 transmits RF energy towards the ARU (10 or 12).

General RF transmission step 200 comprises sub-steps 106, 108, 110 and 112.

At sub-step 106, the position of the ARU relative to the source of RF energy is determined (and from this the distance and angle therebetween can be inferred). Thus at sub-step 108, a source-aim signal can be generated for the RF energy-source. These determinations can be made onboard the ARU, or can be determined offboard the ARU (for example at the mobile platform) and communicated to the ARU.

Accordingly, at sub-step 110 the source of the RF energy is aimed at the ARU, and then at sub-step 112, RF energy is transmitted towards the ARU and consequently at step 114 RF energy is received at the ARU.

With the RF energy received at the ARU, the next general step 300 is to deflect at the ARU the RF energy to illuminate a target.

General deflection/illumination step 300 comprises sub-steps 118, 120, 122 and 124.

The first sub-step 118 determines the position of the target relative to the ARU and also analyses the received RF energy. The analysis of the RF received energy may be done using sensors at the ARU, or may be inferred from the range, angle and RF energy characteristics of the source 22.

As a prerequisite to this sub-step 118, a target is assumed to have been previously identified, or is identified via a target identification process 116.

With knowledge of the relative positions of the ARU and the target, at sub-step 120 a redirect-signal can be generated, in order to configure the ARU to deflect the received RF energy towards the target.

Thus at sub-step 122 the redirect signal is fed to the steerable director to redirect the RF energy to the target, thereby effecting sub-step 124 where the target is illuminated.

The duration of transmission and illumination may be predetermined (for example so that a particular communication signal can be delivered) or may be dependent on fulfilment of certain criteria (for example the sufficient incapacitation of a target). However, for the duration of the transmission and illumination, the sub-steps 106, 108, 110 and 118, 120, 122 loop continuously to maintain aim on the ARU and target respectively. The control of these loops is regulated by modules 113 and 123 respectively.

Not all of the steps need occur sequentially, particularly so at initiation of the system. For example in other arrangements it may be possible, in advance of any RF transmission, to: (i) perform the position-determination, signal-generation and aiming steps 106, 108, 110 for facilitating the transmission to the ARU; substantially at the same time as (ii) performing the position-determination and received energy analysis, signal-generation and director-repositioning steps 118, 120, 122 for facilitating the transmission from the ARU. Thus any subsequent transmission could immediately illuminate the target.

Moreover, if the system were imputed with knowledge of the limits of its redirecting capabilities (e.g. arising from the constraints of the steerable source of RF energy and/or the ARU steerable director) it may be able to recognise when these limits would be exceeded given initial positions, and in such circumstances issue feedback that an illumination was not presently possible and/or suggest a repositioning of the platform source or the ARU.

The particular component or components of the ARU selected to receive the RF energy (i.e. selected to have RF energy transmitted to them) will depend on the structure of the ARU. In ARU 10 and 12, their respective directors receive the RF energy.

Figure 4:
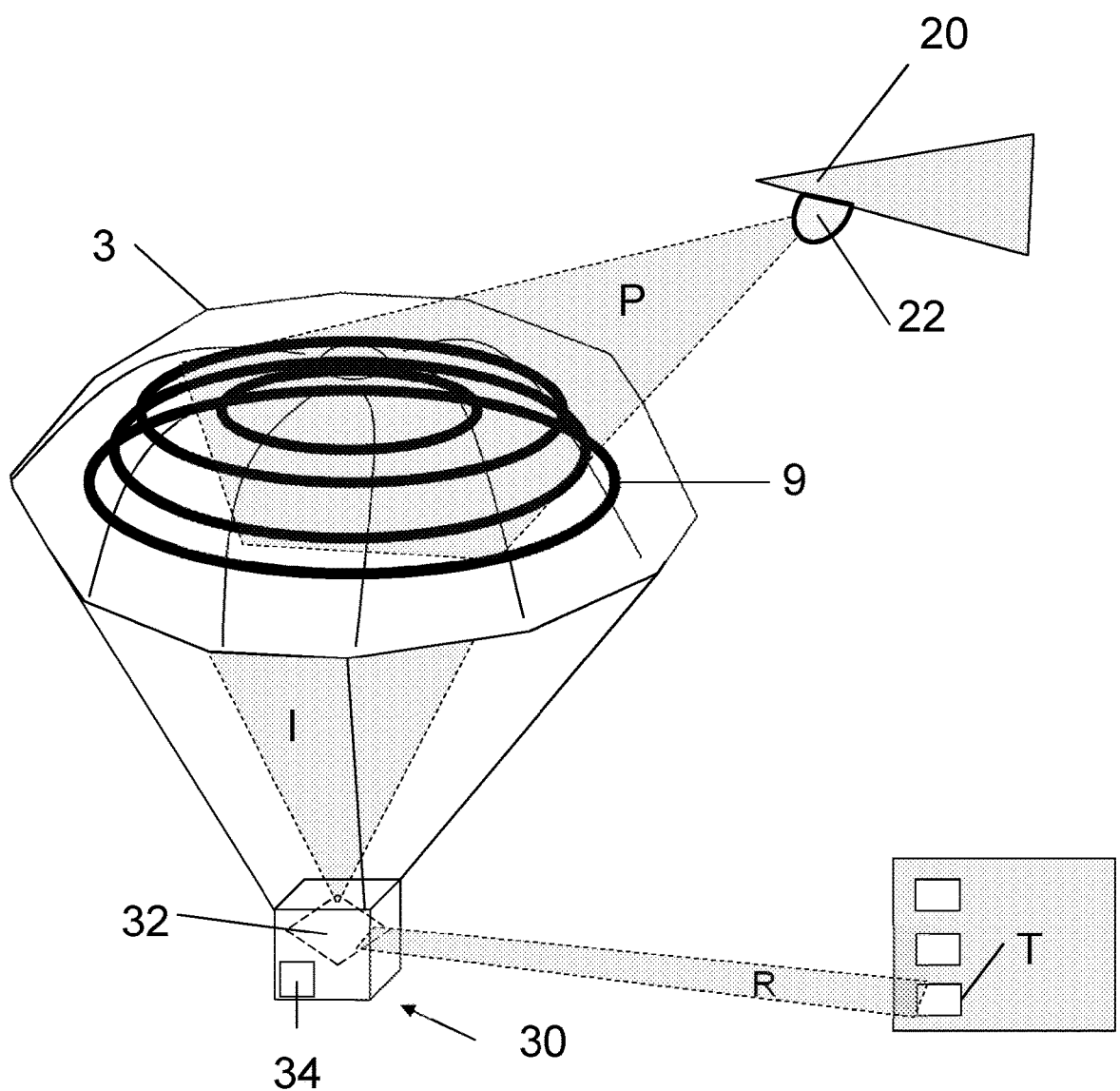
FIG. 4 shows a further embodiment of an ARU.

Referring to FIG. 4 a 'two-stage redirect' ARU 14 is shown comprising a beam-shaping canopy 3 from which is suspended by lines 7 an active director 30.

In common with the canopy 6, the beam-shaping canopy 3 comprises a dome shaped element for increasing drag as the ARU 14 descends. However, ARU 14 also comprises an integrated configuration of beam-shaping elements 9. In particular, the beam-shaping elements used here provide an array of concentric conductive rings adapted to focus RF energy by diffraction.

In alternative embodiments, the canopy 3 may be adapted to refract the incident RF beam with the material of the canopy (which could be Nylon) having certain additives distributed throughout in a non-homogenous manner. Alternatively an additive coating may be applied to varying depths on the surface of the canopy 3.

Such additives would tend to provide spatially varying electromagnetic properties (e.g. permittivity and permeability) to give the desired refractive properties and in turn deflect the radiation incident on the canopy 3 as desired.

The shape of the canopy can be chosen to assist in achieving the desired effects, and can be provided to offer synergies in aerodynamic drag and deflective properties in particular. The dome-shape canopy 3 can approximate to a convex lens form.

In alternative embodiments, the canopy 3 may comprise a plurality of sub-canopies arranged as a stack, separated at a certain distance, to provide further beam deflection effects. Such stacked canopies may be mounted on an inflatable frame (inflated by air flow or by the release of gas from an integrated canister).

The active director 30 comprises a reflecting and collimating element 32 mounted on a steerable gimbal (not shown). The orientation of the reflecting and collimating element 32 can be adapted in response to signals from a controller module 34.

Figure 5:
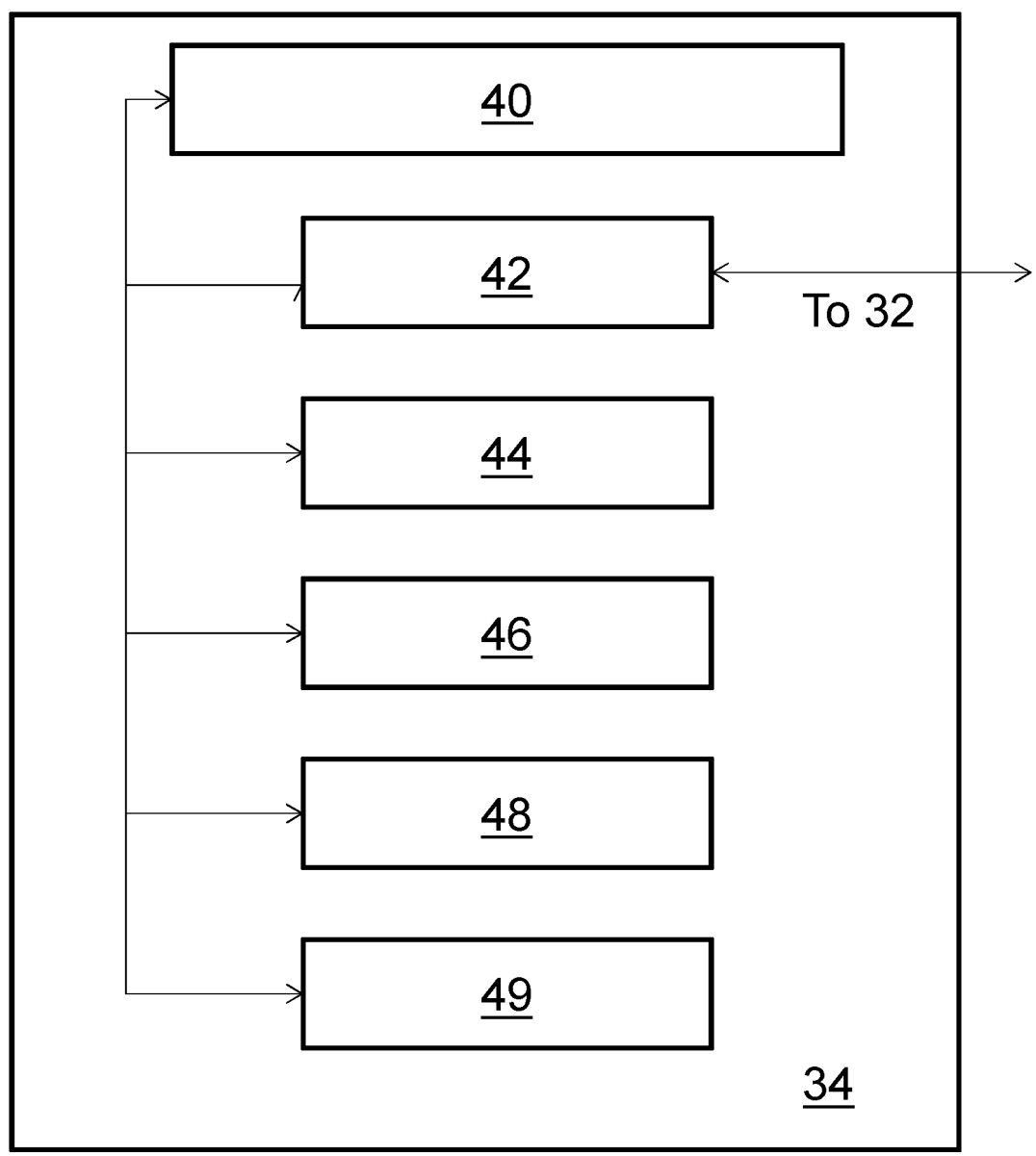
FIG. 5 shows a module within the ARU of FIG. 4.

With reference to FIG. 5 the controller module 34 comprises a controller 42 (for issuing signals to actuators to reposition the reflecting and collimating element 32), a global navigation sensor system 48 (e.g. GPS) for determining the absolute position of the ARU, a sensor transceiver 46 for target detection and tracking, a stabilisation module 44, a memory 49, and a processor 40 operably communicating with each of these and configured to determine how to deflect the incoming RF energy towards the target.

In operation, the mobile platform 20 identifies the location of the 'two-stage redirect' ARU 14, and directs its RF energy source 22 towards specifically the beam-shaping canopy 3, thereby illuminating it with beam P. The energy source 22 may select a particular divergence for the beam P dependent on the distance between the source 22 and the canopy 3. Other characteristics of the beam P may be selected, dependent on the angle between the source 22 and the canopy 3.

The beam-shaping canopy 3 focusses beam P into an intermediate beam I which is directed to and focussed on the reflecting and collimating element 32 within the active director 30.

The reflecting and collimating element 32 is configured to be in a position such that the focussed intermediate beam I is reflected towards the target T as a collimated beam R. In an alternative example, the reflecting and collimating element 32 may be replaced with a reflecting and focussing element, for focussing the beam R on the target T.

The position of the reflecting and collimating element 32 is effected, both initially and thereafter, by a redirect signal from the controller module 34.

The controller module 34 generates the redirect signal with reference to signals from the target detection unit 46, and a routine (which may be a look up table in memory device 49 or an algorithm stored in FPGA etc) for associating reflective element 32 orientations with particular beam R output directions, given input beam I.

In particular the controller module 34 receives from the target detection unit 46 a signal indicating the position and range of the target relative to the ARU 14. This position is converted at the processor 40 into a direction vector from the reflecting and collimating element 32, and this is in turn converted into a redirect signal indicating the position in which the reflecting and collimating element 32 should be held, given the incoming beam I. This redirect signal can then be relayed via the controller 42 to the actuators associated with element 32 to effect the position.

In some embodiments, the source of RF energy may be mounted on a gimbal and thereby steerable through being physically rotated in various axes. Alternatively or in addition, the RF energy source may be in the form of a phased array for steering the RF energy by controlling the phase of the signal emitted from each of the elements in the array.

In particular the steerable source of RF energy may be an RF phased array mounted on a gimbal.

The platform to which the RF source is mounted may be an aircraft but may alternatively be any form of vehicle including land vehicles and naval vessels.

In some arrangements it may be possible to have the source of energy mounted to the platform with a fixed orientation, provided that the platform itself is mobile enough to vary its own orientation in order to vary the orientation of the source.

What is claimed is:

1. A method of illuminating a target with RF energy, the method comprising:
   providing a steerable source of RF energy configured for generating a platform RF energy beam;
   deploying an airborne redirection unit (ARU) configured for redirecting the platform RF energy beam, the ARU comprising:
      a parachute canopy comprising a surface configured to slow a rate of descent of the ARU without arresting or reversing the descent of the ARU; and
      a beam director supported by the parachute canopy;
   transmitting by the steerable source of RF energy the platform RF energy beam towards the ARU, thereby illuminating the ARU;
   receiving at the ARU the platform energy beam; and
   redirecting by the ARU the platform RF energy beam so as to provide a redirected RF energy beam that is directed towards the target, said target being thereby illuminated by the redirected RF energy beam;
   wherein the method does not include accepting and processing of any data intentionally transmitted by the target.

2. The method according to claim 1, further comprising:
   determining a position of the ARU relative to the source of the RF energy; and
   generating, based on the position of the ARU relative to the source of RF energy, a source-aim signal for the source of RF energy;
   the source-aim signal being configured to establish or adjust the RF energy source such that the platform energy beam is directed towards the ARU or remains directed towards the ARU as the position of the ARU relative to the position of the source of the RF energy changes.

3. The method according to claim 2, further comprising:
   acquiring information defining at least one limitation of the steerable source; and
   comparing the at least one limitation of the steerable source to the generated source-aim signal, thereby determining whether the at least one limitation will prevent the source-aim signal from successfully establishing or adjusting the RF energy source such that the platform energy beam is directed towards the ARU, given the instantaneous position of the ARU relative to the source of RF energy; and
   if the source-aim signal will be prevented by the at least one limitation from successfully establishing or adjusting the RF energy source such that the platform energy beam is directed towards the ARU, given the instantaneous position of the ARU relative to the source of RF energy:
      determining an acceptable position of the ARU relative to the source of RF energy that will enable the source-aim signal to successfully establish or adjust the RF energy source such that the platform energy beam is directed towards the ARU; and
      moving the ARU or the source of RF energy such that the position of the ARU relative to the source of RF energy satisfies the acceptable position.

4. The method according to claim 1, further comprising:
   determining a position of the target relative to the ARU; and
   generating, based on the position of the target relative to the ARU and a position of the ARU relative to the source of RF energy, a redirect signal configured for providing a configuration of the ARU, such that the ARU is able to illuminate the target or maintain illumination of the target as the position of the source of RF energy, the position of the ARU, or the position of the target changes.

5. The method according to claim 4 further comprising:
   acquiring information defining limitations for configuring the ARU;
   comparing the limitations for configuring the ARU to the redirect signal, thereby determining if the limitations for configuring the ARU will prevent the redirect signal from successfully configuring the ARU to illuminate the target or maintain illumination of the target as the position of the source of RF energy, the position of the ARU, or the position of the target changes, in view of the position of the ARU relative to the source of RF energy, and the position of the ARU relative to the target; and if the redirect signal will not be able to successfully configure the ARU to illuminate the target or maintain illumination of the target as the position of the source of RF energy, the position of the ARU, or the position of the target changes:

determining an acceptable combination of the position of the ARU relative to the source of RF energy, the position of the ARU relative to the target, and the configuration of the ARU, wherein said acceptable combination will enable the redirect signal to successfully configure the ARU to illuminate the target or maintain illumination of the target as the position of the source of RF energy, the position of the ARU, or the position of the target changes; and implementing the acceptable combination.

6. The method according to claim 4, further comprising providing at the ARU a steerable director configured for determining the direction of the redirected RF energy beam, wherein the redirect signal is configured to adjust the steerable director such that it illuminates or maintains illumination of the target as the position of the ARU relative to the position of the target changes.

7. The method of claim 1, wherein the parachute canopy is dome-shaped.

* * * * *